United States Patent
Paek et al.

(10) Patent No.: US 8,521,193 B2
(45) Date of Patent: Aug. 27, 2013

(54) ENERGY-EFFICIENT POSITIONING SYSTEM FOR SMARTPHONE USING CELL-ID SEQUENCE MATCHING

(75) Inventors: Jeongyeup Paek, Santa Clara, CA (US); Kyu-Han Kim, Palo Alto, CA (US); Jatinder Pal Singh, Mountain View, CA (US)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 13/294,280

(22) Filed: Nov. 11, 2011

(65) Prior Publication Data

US 2012/0149400 A1    Jun. 14, 2012

Related U.S. Application Data

(60) Provisional application No. 61/420,857, filed on Dec. 8, 2010.

(51) Int. Cl.
*H04W 4/00*    (2009.01)
*H04W 24/00*    (2009.01)

(52) U.S. Cl.
USPC ............... 455/457; 455/456.3; 455/432.1

(58) Field of Classification Search
USPC ............... 705/1; 455/457, 456, 432
See application file for complete search history.

(56) References Cited

U.S. PATENT DOCUMENTS

| | | | |
|---|---|---|---|
| 2009/0325603 A1* | 12/2009 | Van Os et al. | 455/456.2 |
| 2010/0082357 A1* | 4/2010 | Follmann et al. | 705/1 |
| 2010/0190513 A1* | 7/2010 | Andreasson | 455/456.3 |
| 2011/0215966 A1* | 9/2011 | Kim et al. | 342/357.29 |
| 2011/0244859 A1* | 10/2011 | Tsuda | 455/436 |

* cited by examiner

*Primary Examiner* — Nizar Sivji
(74) *Attorney, Agent, or Firm* — Leydig, Voit & Mayer, Ltd.

(57) ABSTRACT

A method for navigation based on a cellid-aided positioning system includes: determining, at a cellid-aided positioning system-compatible device, that a user has moved through a sequence of cellids, wherein moving through a sequence of cellids comprises moving from a first region corresponding to a first cellid to a second region corresponding to a second cellid; accessing previously stored route information corresponding to the sequence of cellids, wherein the previously stored route information includes previously recorded sequences of cellids and global positioning system (GPS) information; estimating a current position of the user based on the previously stored route information; and displaying the current position of the user.

8 Claims, 20 Drawing Sheets

ENERGY-EFFICIENT POSITIONING SYSTEM FOR SMARTPHONE USING CELL-ID SEQUENCE MATCHING

CROSS-REFERENCE TO RELATED APPLICATION

This patent application claims the benefit of U.S. Provisional Patent Application No. 61/420,857, filed Dec. 8, 2010, which is herein incorporated by reference in its entirety for all that it teaches without exclusion of any portion thereof.

FIELD

The present invention relates generally to smartphones and more particularly to energy-efficient smartphone positioning mechanisms.

BACKGROUND

While smartphones have great utility as long as they are within range of appropriate networking infrastructure, some uses can require that the smartphone location be more precisely identified. For example, numerous emerging smartphone applications require position information in order to provide location-based or context-aware services to the smartphone user. In these applications, GPS is often preferred over its alternatives such as cell tower-based positioning systems because it is known to be more accurate. Indeed, cell tower-based localization has errors as high as 500 meters. For this reason, the use of GPS for location-based applications is likely to continue, although it may be augmented with other positioning methods.

Unfortunately, GPS technology requires substantial power, and keeping GPS activated on a smartphone continuously can drain the battery in less than 12 hours in many cases, even in the absence of other activity. This high energy consumption presents a hurdle to all-day smartphone usage.

SUMMARY

In an embodiment, the present invention provides a method for navigation based on a cellid-aided positioning system, the method including: determining, at a cellid-aided positioning system-compatible device, that a user has moved through a sequence of cellids, wherein moving through a sequence of cellids comprises moving from a first region corresponding to a first cellid to a second region corresponding to a second cellid; accessing previously stored route information corresponding to the sequence of cellids, wherein the previously stored route information includes previously recorded sequences of cellids and global positioning system (GPS) information; estimating a current position of the user based on the previously stored route information; and displaying the current position of the user.

In another embodiment, the present invention provides a device for navigation based on a cellid-aided positioning system, the device having a tangible, non-transient computer-readable medium with computer-executable instructions stored thereon, the computer-executable instructions including: instructions for determining that a user has moved through a sequence of cellids, wherein moving through a sequence of cellids comprises moving from a first region corresponding to a first cellid to a second region corresponding to a second cellid; instructions for accessing previously stored route information corresponding to the sequence of cellids, wherein the previously stored route information includes previously recorded sequences of cellids and global positioning system (GPS) information; instructions for estimating a current position of the user based on the previously stored route information; and instructions for displaying the current position of the user.

DETAILED DESCRIPTION

In overview, embodiments of the invention allow more energy-efficient location identification for smartphones by estimating current user position using freely available cell tower information and a history of past GPS coordinates. In particular, smartphone users often exhibit consistency in their everyday routes, and given this, the cellid transition point that the user experiences can be processed as described herein to uniquely identify the current position of the user and their device. The described positioning system achieves reasonable position accuracy at an energy cost similar to that of a network-based (cell tower-triangulation-based) localization schemes.

Although many implementations of the described principles will be apparent to those of skill in the art upon reading this disclosure, the described example is a cellid-aided positioning system (CAPS) prototype on an ANDROID Dev. 2 smartphone. This example has been verified through experimentation and has been shown to provide reasonable positioning accuracy while activating the GPS functionality only 0.6% of the time compared to always-ON GPS.

The disclosure will first discuss and explain the inaccuracy of cell tower-based localization schemes before proceeding to discuss the invention in greater detail. In short, there is significant uncertainty in cell tower-based localization reported positions—in some cases as high as few kilometers.

Figure 1:
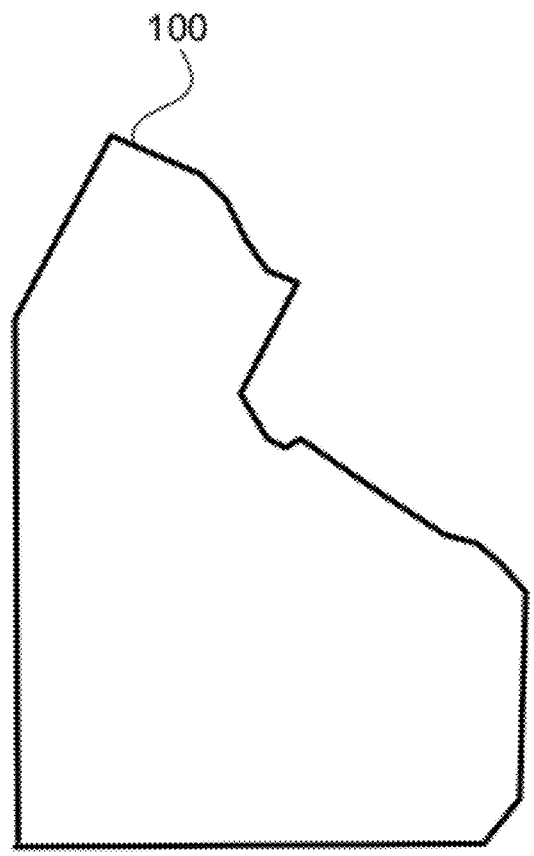
FIG. 1 is a line drawn GPS identified route corresponding to a first experimental route.
Figure 2:
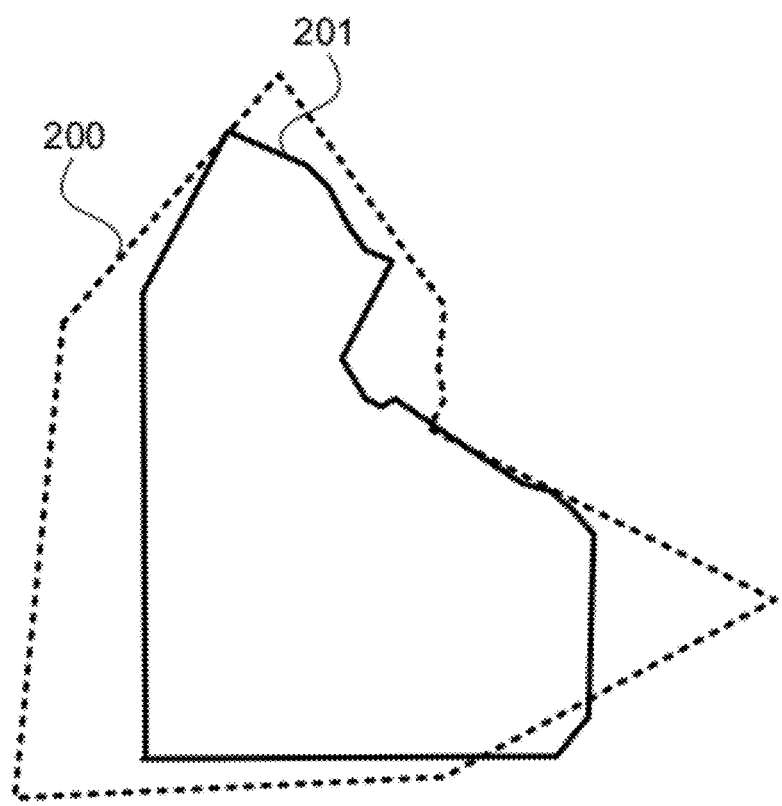
FIG. 2 is a line drawing overlaying a cell tower-based localization for the first route on the GPS trace of FIG. 1.

FIG. 1 plots a GPS trace 100 collected in the Los Altos, Calif. area using a smartphone that continuously logged GPS positions every 2 seconds. For comparison, FIG. 2 plots another trace 200 derived using the cell tower-based localization scheme for the same route (herein referred to as "Route-1"). The illustrated data was obtained using a small program that recorded raw GPS readings and cell tower-based localization readings using the Location API provided by the ANDROID OS. Subsequently, the GOOGLE MAPS API v3 was used to plot the points as shown.

Figure 3:
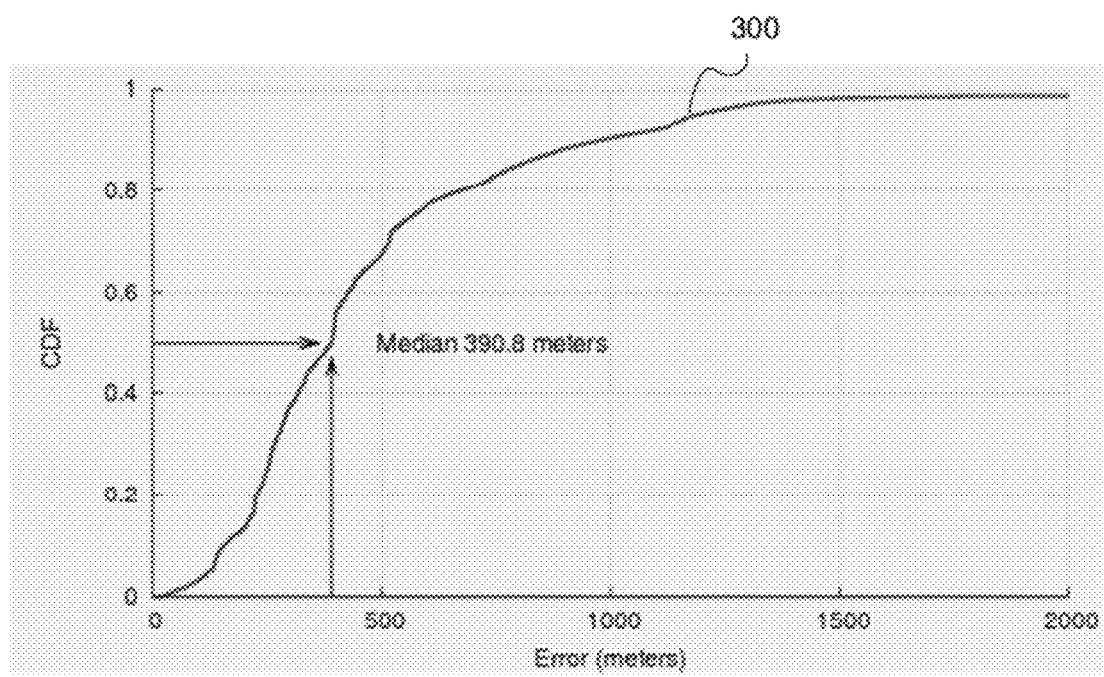
FIG. 3 is a CDF plot of localization error for cell tower-based localization.

As can be seen from trace 200 of FIG. 2 and trace 100 of FIG. 1 (shown as 201 in FIG. 2), the cell tower-based localization is very coarse-grained; the positioning error is high with a median of 390 meters and as high as a few kilometers. This is shown in plot 300 of FIG. 3. Repeated experiments were consistent with those shown, and confirmed that cell tower-based localization schemes are generally inconsistent and always inaccurate.

Figure 4:
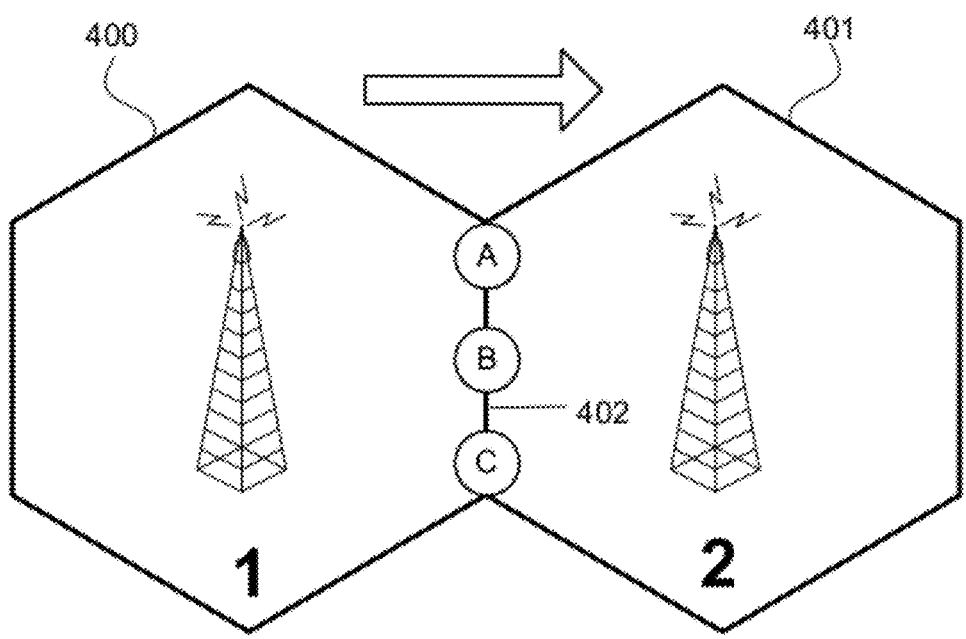
FIG. 4 is a schematic view of cells and a transition causing a cellid change from 1 to 2.

As noted above, smartphone users are fairly consistent in their everyday routes, and the cellid transition points that the user experiences can be leveraged over time to identify the current user position. Consider a case where a smartphone has just indicated that the cellid has changed from 1 to 2 at a certain moment by traveling from cell 1 (400) to cell 2 (401) as shown in FIG. 4. At this point it is difficult to resolve the current position from among edge positions labeled 'A', 'B', and 'C'. In particular, there is not enough current information in a simple cell switch notification to resolve the position to a certain position on the edge 402.

Figure 5:
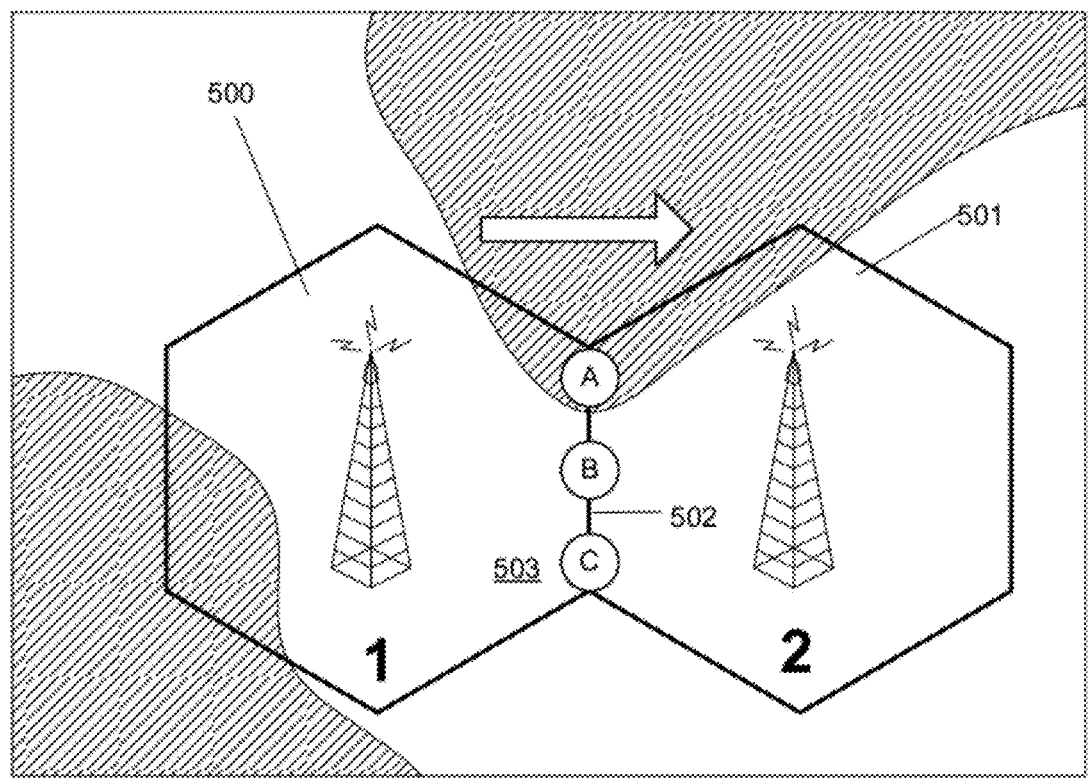
FIG. 5 is a schematic view of cells and of a cellid change from 1 to 2 on a bridge.

However, a different situation is presented by FIG. 5, where the current information includes information not only about the switch from cell 1 (500) to cell 2 (501) at boundary 502, but also about the underlying geography. In particular, since locations 'B' and 'C' are positions lying in water 503, they are less likely candidates for cellid transition points. With this additional information, the current position can be estimated to be location 'A' with a reasonable degree of confidence.

Figure 6:
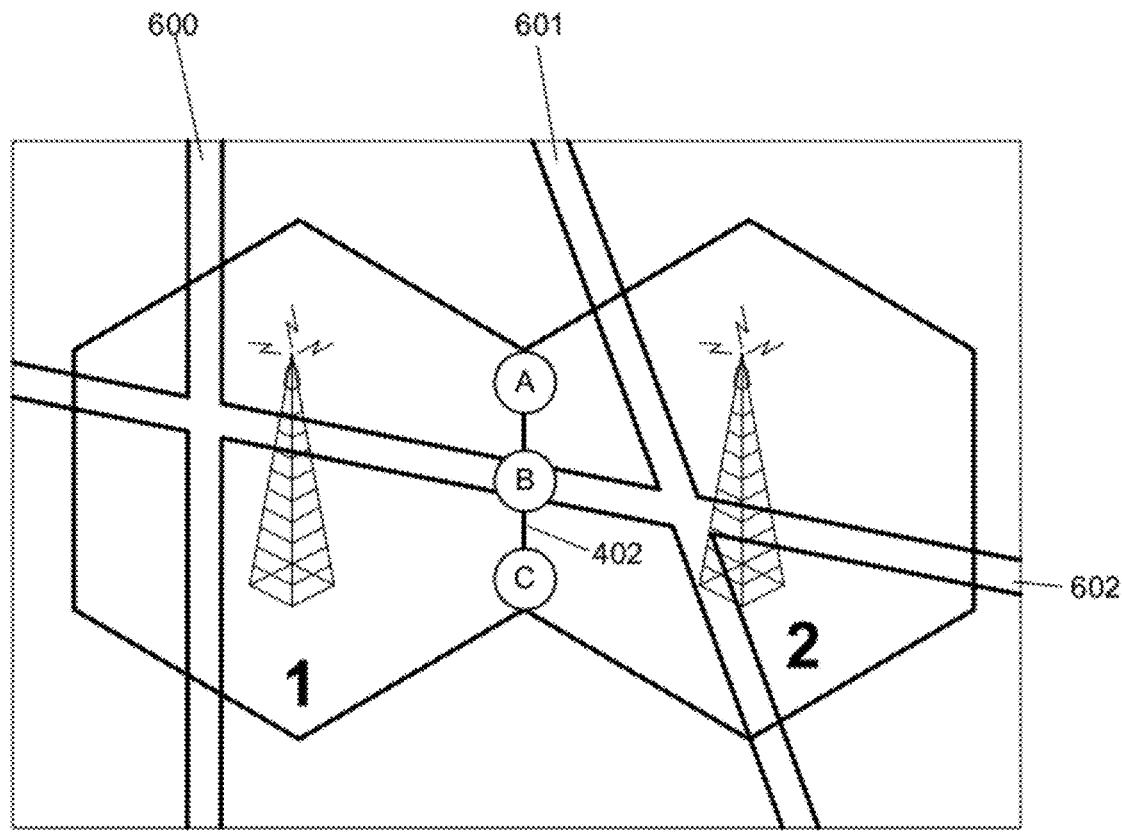
FIG. 6 is a schematic view of cells and of a cellid change from 1 to 2 at a frequently visited area.

Another example is shown in FIG. 6. In this example, it is known that a user uses a certain road 602 to commute (to the exclusion of roads 600 and 601) and that the user's office position 602 is at position 'B'. With this further information, the user's position when the cellid changed from 1 to 2 can be estimated with reasonable accuracy. In particular, it is probable that point 'B' is the current position.

Figure 7:
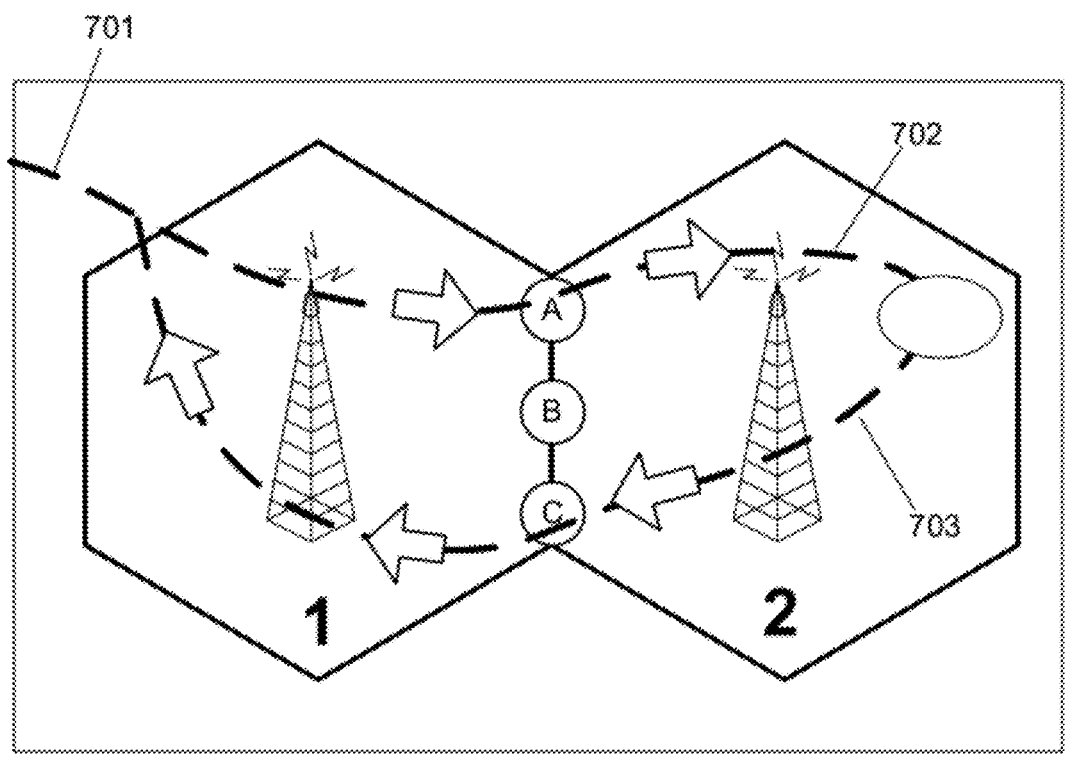
FIG. 7 is a schematic view of cells and of a cellid change from 2 to 1 at different times of day.

In addition to knowing the locations frequented and routes used by the user, the dimension of the time-of-day can also be used to resolve position. FIG. 7 shows a user's normal commuting route 701. Further, it is known that the upper portion 702 of the route 701 is the route that the user takes in the morning, and the lower portion 703 of the route 701 is the route that user takes in the evening. In this situation, when the user's cellid has changed from 2 to 1 and the current time is 9:00 AM, it can be inferred that the current position is position 'A'.

Figure 8:
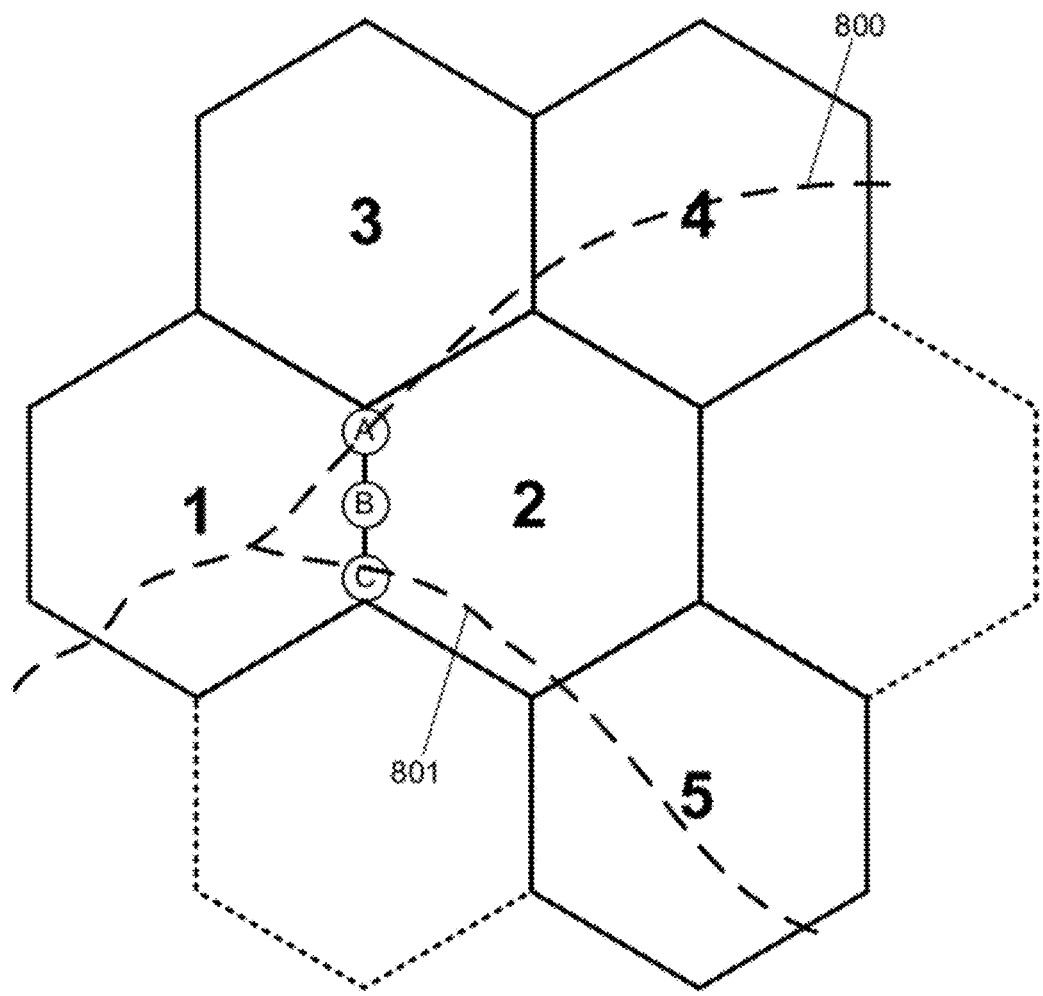
FIG. 8 is a schematic example of a sequence of cellids showing the user's frequently-used routes on a cellid map.

An example using a sequence of cellids is shown in FIG. 8. The user's frequently-used routes are shown in dashed curves, and an example cellid map is overlaid on top of it including cells 1-5. In this situation, if the user has experienced a sequence of cellid changes as [4-3-2-1] recently, it is possible to infer that the user is following the upper route 800, and the users current position at the 2-1 switch is point 'A'. On the other hand, if the user recently experienced a sequence of cellids [5-2-1], then it is likely that the user is at position 'C' at the 2-1 switch.

The foregoing examples show the use of cellid sequence, and time-of-day, and history of GPS coordinates to resolve position at cell switch points. An example CAPS implementation for smartphone applications will be described in greater detail. The system is designed for smartphone applications that require position information for location-based context-aware services. The system reduces the amount of energy spent by the positioning system while still providing sufficiently accurate position information. Ideally, the system will provide an energy cost similar to strictly network-based schemes with an accuracy closer to that of GPS schemes.

In an embodiment, given a current <cellid, time> tuple and current sequence of cellids that the user (device) has moved through recently, the CAPS refers to its history database to estimate its current position. If there is a cellid change, i.e., the current cellid has changed from the last time the device checked the cellid, the CAPS performs a new sequence selection by running the sequence selection algorithm. If there is a match, CAPS uses that sequence to calculate the position estimate. If there is no match, CAPS turns on the GPS.

If there is no change in cellid and if there is a match that has been selected previously, the system estimates the current position by following the GPS coordinates associated with that sequence based on the time difference since its entrance into that cellid. When the time difference since the entrance into that cellid correspond to a point in time between two points in the history, CAPS interpolates to estimate the current position.

Although any suitable sequence matching algorithm may be used, in an embodiment CAPS employs a modified Smith-Waterman algorithm for cellid sequence matching. The Smith-Waterman algorithm is an algorithm known for determining similar regions between two nucleotide or protein sequences in bio-informatics. Instead of looking at the total sequence, the Smith-Waterman algorithm compares segments of all possible lengths and optimizes the similarity measure. Smith-Waterman is a dynamic programming algorithm. As such, it will find the optimal local alignment with respect to the scoring system being used (which includes the substitution matrix and the gap-scoring scheme).

Using this algorithm, CAPS determines whether there is any match between two cellid sequences, namely the currently running sequence that the device has just moved through, and a sequence in the route history database. In this embodiment, two modifications are made to the Smith-Waterman algorithm: first, the system employs infinite penalty for gaps and mismatches; that is, it does not allow any gaps or substitutions in cellid sequence match. This results in finding only exact subset matches rather than similar match with gaps and substitutions (insertion/deletion/mismatch).

Secondly, a constraint is used to require that the last (most recent) cellid of the currently running sequence is in the matched subset. The output of the sequence matching algorithm is the match characteristics of the two sequences. In other words, the algorithm identifies which part of the two sequences match, and identifies the length of the match.

Figure 9:
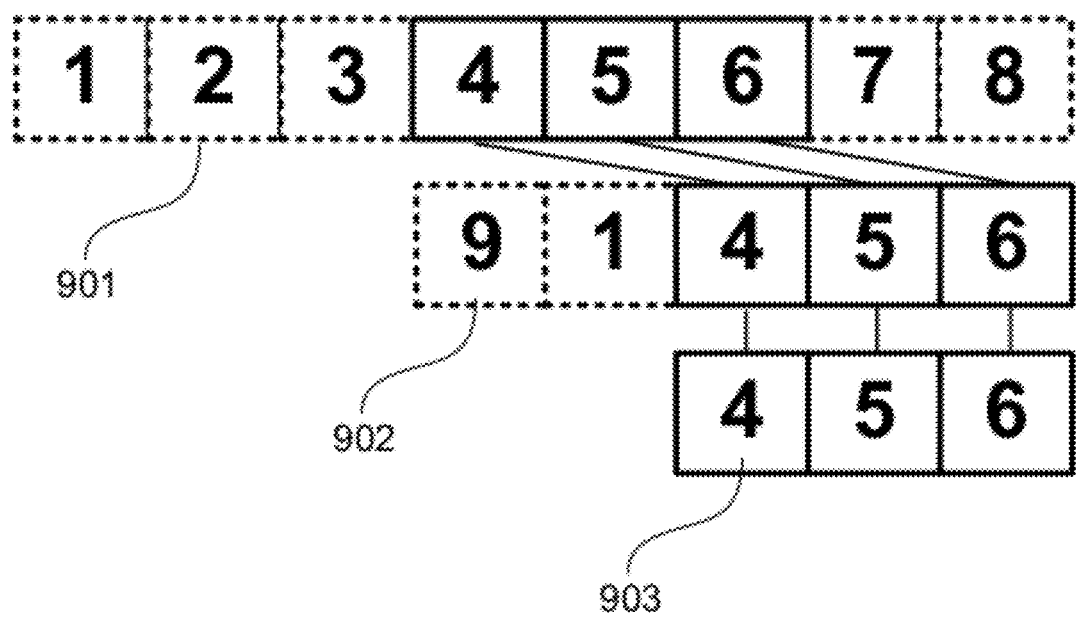
FIG. 9 is a logical diagram showing cellid sequence according to an embodiment of the invention.

The data display of FIG. 9 shows an example of a sequence matching. The target sequence 901 contains the eight cellids [1, 2, 3, 4, 5, 6, 7, 8]. The current sequence 902 contains the five cellids [9, 1, 4, 5, 6]. The matching algorithm reveals that the triplet of cellids [4, 5, 6] 903 matches.

After running the sequence matching algorithm on all routes in the database, there may be a set of sequences that have a match with match length greater than zero. Among these sequences, the system then selects one that is the best match for estimating current location. The following priority (tie-breaking) rules are used in an embodiment
1) longer match sequence preferred to yield a higher chance of finding the correct route,
2) same/similar time-of-day preferred to exploit habitual patterns,
3) frequent routes are preferred to increase chance of encountering more frequently taken route,
4) tail-to-head match preferred (latest in current sequence to head of a saved sequence to provide prediction.

Sequence profile storing rules can be applied in various further embodiments to provide regularity in data organization. For example, whenever the device's GPS function is active and CAPS obtains a GPS reading, it inserts the associated triplet [GPS latitude, GPS longitude, time] at the end of an array associated with the current cellid. Whenever there is a change in the cellid, CAPS inserts this cellid at the end of 'current cellid sequence' along with the associated triplets.

Figure 10:
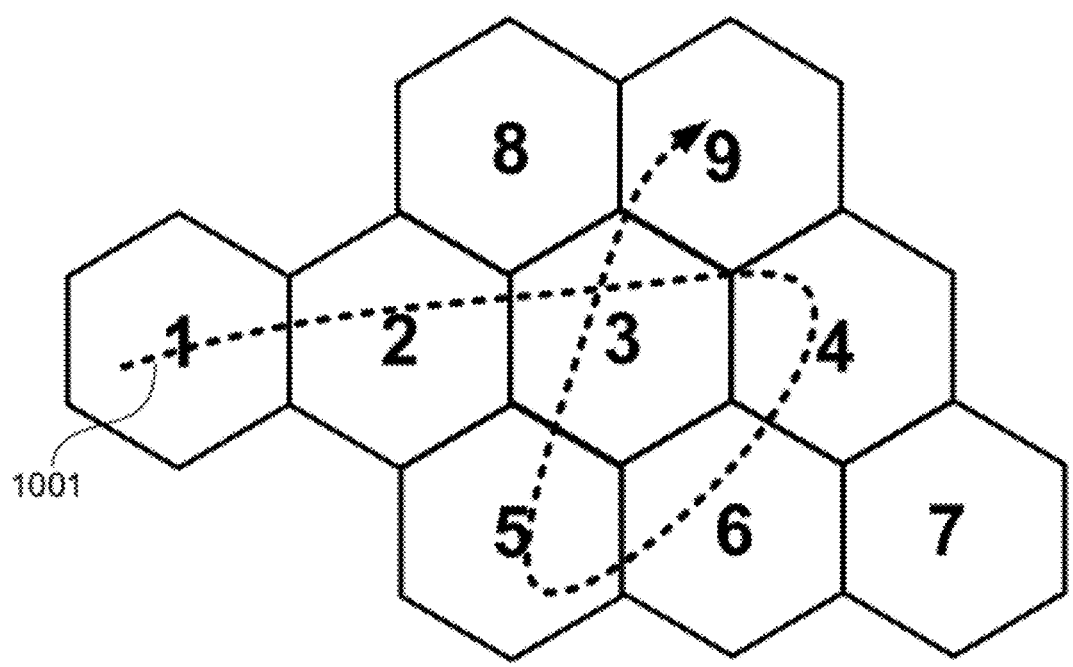
FIG. 10 is a schematic example of a sequence of cellid changes.

If a duplicate cellid appears in the current cellid sequence, CAPS declares this as a sequence segmentation point and store this cellid sequence to the database along with all the associated [latitude, longitude, time] arrays. A new current sequence begins from the point in sequence after the duplicate cellid. For example, if the current sequence was "1 2 3 4 6 5 3 (9)", then "1 2 3 4 6 5" is stored into the database, and a new sequence starts with "4 6 5 3 (9)" where (9) is the current cellid. The device path 1001 yielding the foregoing cellid sequences is shown in FIG. 10. As can be seen, the device path 1001 loops and passes through cell 3 twice, leading to the duplicate cellid.

In an embodiment, a large jump in time without any discernable change in cellid or GPS data (e.g. during periods of GPS unavailability) is taken to denote a segmentation point. When GPS is available, CAPS initially performs cellid sequence matching to obtain a position estimate, and then compares this estimate with the current GPS position to evaluate the correctness of the matched sequence. If the matching and estimation is successful with good quality, CAPS may request that the device's GPS functionality be turned off to save power.

As mentioned above, a prototype implementation of CAPS was tested on a modern smartphone with good results. The test implementation of CAPS was constructed in Java and deployed via the ANDROID 1.5 API for ANDROID smartphones. The experiments used the HTC Dev. 2 ANDROID smartphone which has GPS on the T-MOBILE GSM network. The experiments were executed in the Los Altos and Sunnyvale areas of California.

The experiments were evaluated on two metrics. The first of these was the "GPS On Time," i.e., the percentage of time that the GPS was turned on relative to a device running the always-on GPS. The second metric was the positioning error measured as the median distance between the estimated position and the position reported by the GPS. Each phone was seeded with five iterations worth of prior GPS history. Each experimental round ran for approximately 20 minutes for "Route-1" and 40 minutes for "Route-2" and several runs were conducted. Additional runs showed qualitatively similar results.

Figure 11:
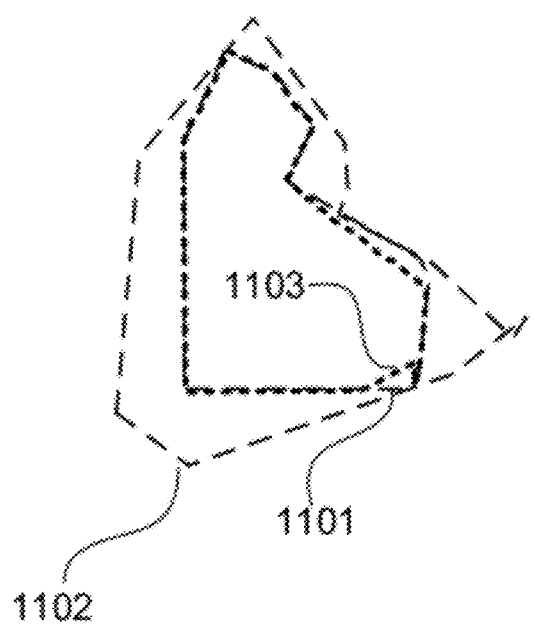
FIG. 11 is a line drawing overlaying a GPS localization trace, a cell tower-based localization trace, and a CAPS (cellid-aided positioning system) localization trace for a first route according to an embodiment of the invention for a first route.

FIG. 11 shows experimental results for "Route-1". In particular, the figure shows the GPS trace 1101, cell tower-based localization trace 1102, and the CAPS trace 1103. As can be seen, the CAPS trace 1103 closely matches the GPS trace 1101 while turning on the GPS only 0.6% of the time compared to the always-on GPS with the median positioning error of only 92.8 meters.

Figure 12:
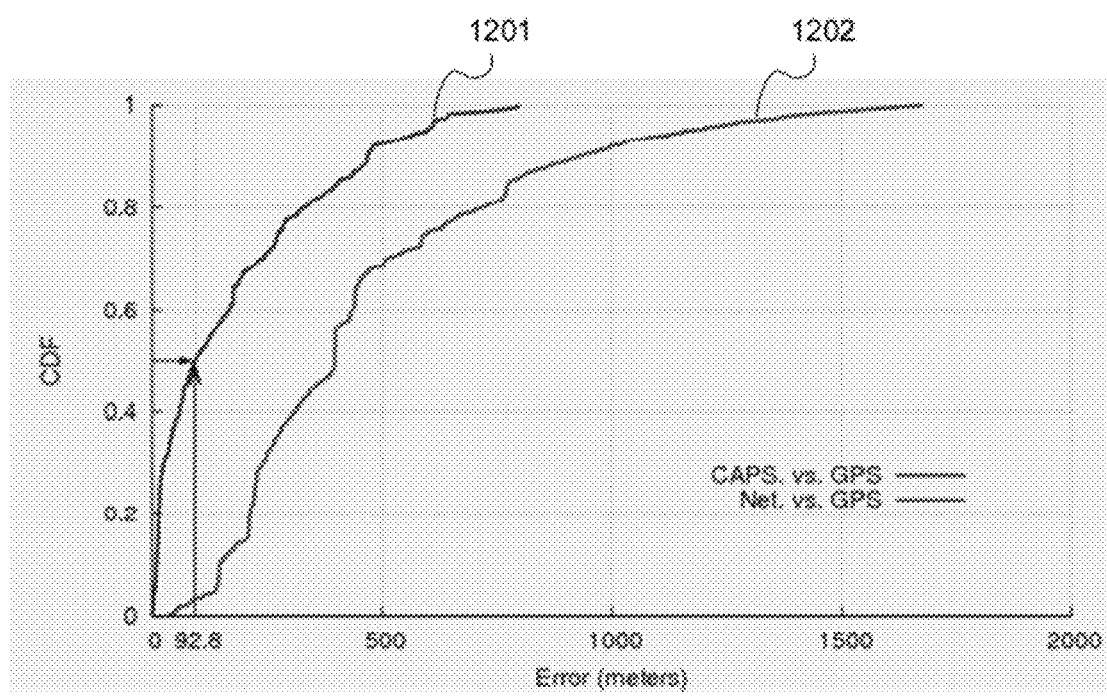
FIG. 12 is a plot of the cumulative distribution of error for CAPS and of cell tower-based localization.

FIG. 12 illustrates a plot of the cumulative distribution of the error for CAPS in plot 1201 and of the cell tower-based localization in plot 1202. As can be seen from the CDF plots, CAPS improves the positioning accuracy significantly, even with the GPS functionality inactive 99.4% of the time.

Figure 13:
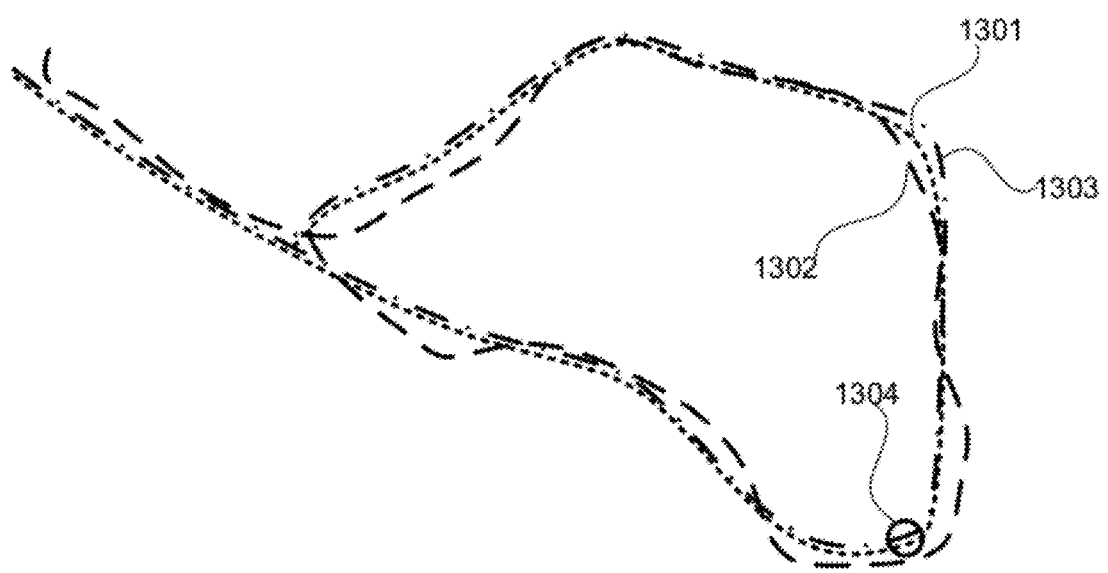
FIG. 13 is a line drawing overlaying a GPS localization trace, a cell tower-based localization trace, and a CAPS localization trace for a first route according to an embodiment of the invention for a second route.
Figure 14:
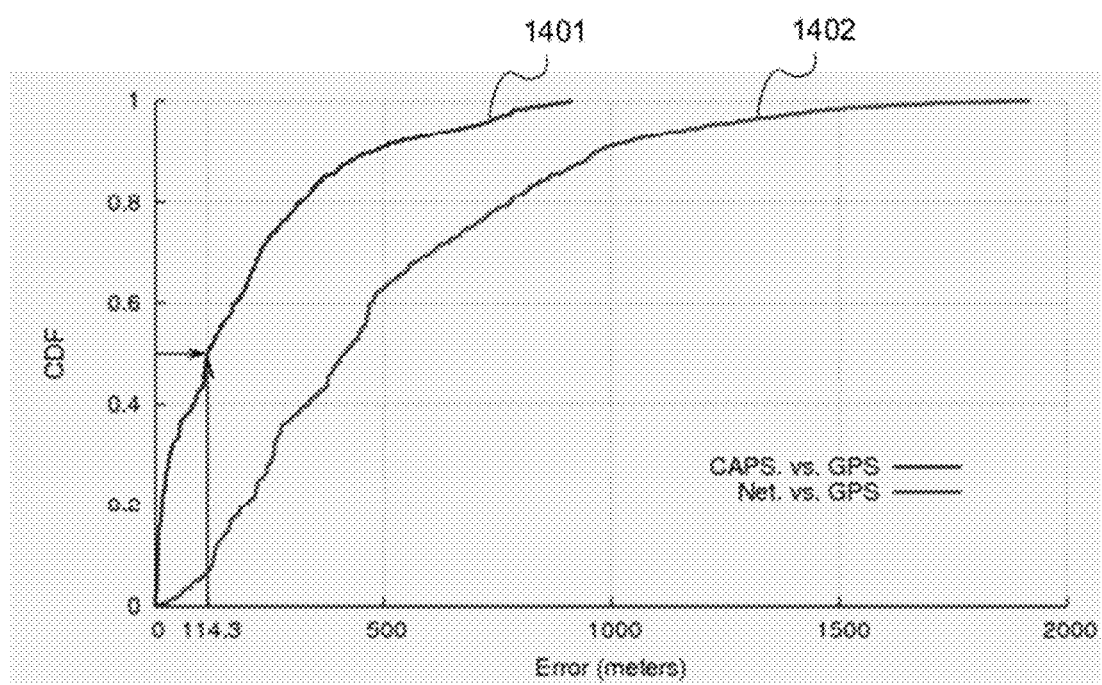
FIG. 14 is a plot of the cumulative distribution of error for CAPS vs. GPS and for cell tower-based localization vs. GPS.

FIGS. 13 and 14 show similar results for "Route-2." FIG. 13 shows the GPS trace 1301, cell tower-based localization trace 1302, and the CAPS trace 1303. For this route, CAPS again closely estimated the GPS trace with a median error of 114.2 meters while achieving a GPS on time of only 1.9%. The portion of the trace where the GPS was on is shown by segment 1304 at the bottom-right corner of FIG. 13. Similar to FIG. 12, FIG. 14 shows via the CDF plot 1401 that CAPS improves the positioning accuracy significantly, with very little GPS assistance needed.

One interesting characteristics of CAPS is that the positioning errors tend to be "on-route," i.e., only in the forward and backward direction relative to the current route track. This can happen due to changed conditions on route, such as when the user encounters a red or green traffic lights in a different way than they previously encountered the light.

Figure 15:
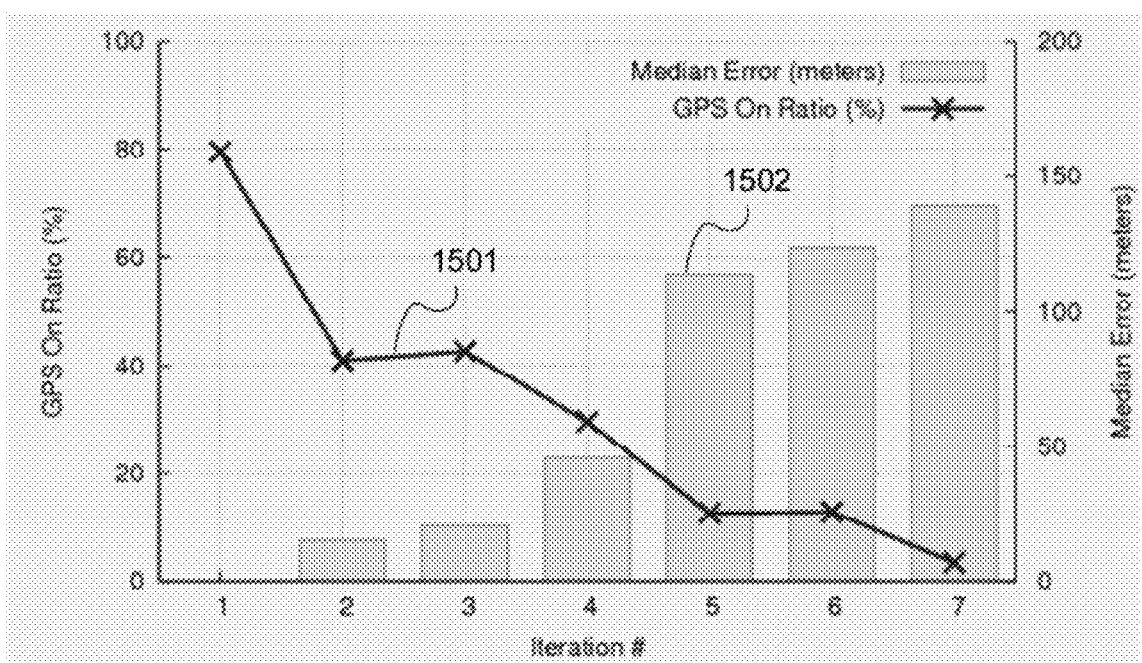
FIG. 15 is a pair of data plots showing the runtime learning performance of CAPS via the change in GPS On ratio and median positioning error as the number of iterations increases.

The CAPS system modifies its behavior as it runs, to reduce the required GPS on time while keeping the median error within preset bounds, e.g., 150 meters. The runtime learning behavior of CAPS is shown by way of example in the data plot 1501 and histogram 1502 of FIG. 15. To collect this data, one phone ran CAPS without any prior history information, and the user ran seven consecutive iterations of the experiment on the same route, Route-3. As can be seen in FIG. 15, for the first iteration, the GPS On ratio was about 80% of the time, meaning that, because there was no prior history information, the CAPS system relied mainly on the GPS to determine the location of the user. As the number of iterations stored in the prior history increase, the CAPS system is increasingly able to rely on stored information relating to sequences of cellids to estimate the position of the user and does not need to utilize the GPS as often.

Thus, as the iterations increase, the GPS On ratio decreases. This is because as the CAPS algorithm learns more about the history of cellids and GPS coordinates, it requires less use of GPS to estimate its current position. Second, as the GPS On ratio decreases, the median error increases, since the system is estimating position with much less input from the GPS function of the device. As can be seen, by the time CAPS has reached the seventh iteration, the GPS on time has been reduced to 1.9% and the error has stabilized. This in turn means that the median error will generally not increase further for further iterations.

As noted above, the CAPS system is almost as accurate as a GPS location system, but it does trade off a little accuracy in achieving greatly reduced energy usage. In an embodiment, the GPS is activated periodically to ensure the accuracy of the system. It will be appreciated that if the GPS is activated too often, it will waste energy, especially when the phone is largely stationary, but if the GPS is activated too infrequently, accuracy may decrease. To analyze this trade-off, one phone was programmed to collect a GPS reading as well as a cell tower-based positioning reading every 2 seconds. GPS readings were sub-sampled to simulate different periodic rates.

Figure 16:
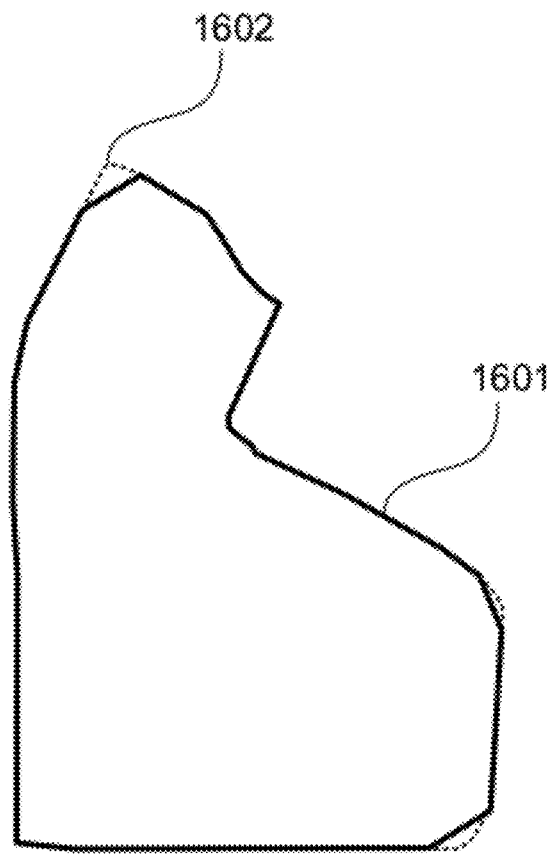
FIG. 16 is a line drawing of a GPS route trace overlayed on a corresponding CAPS route trace.

FIG. 16 plots the GPS trace for Route-1 when GPS was sub-sampled at 10% 1601 compared to when GPS was used 100% of the time 1602. The route reported by this 10% GPS is similar to that reported by CAPS, achieved with a 0.6% GPS activation rate.

Figure 17:
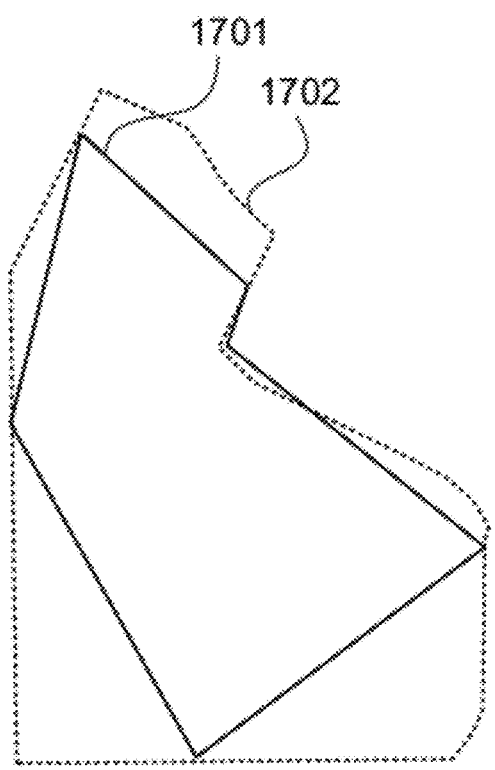
FIG. 17 is a line drawing of a GPS ON route trace overlayed on a corresponding GPS route trace wherein GPS is on only a fraction of the time.
Figure 18:
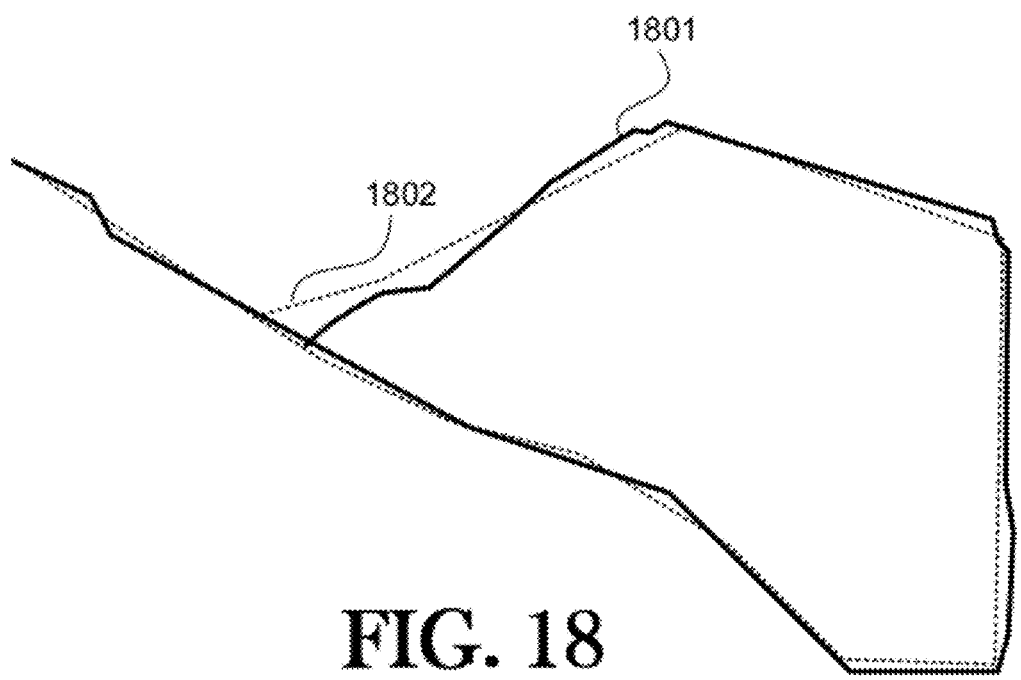
FIG. 18 shows a pair of route traces comparing 100% and 2% GPS usage.

FIG. 17 compares a 2% GPS subsampling result 1701 with 100% GPS activation 1702, showing that periodic GPS with an activation rate comparable to the GPS activation rate used in CAPS is far less accurate than CAPS. The same qualitative result holds for Route-2, as can be seen in the 100% GPS 1801 and 2% GPS 1802 routes of FIG. 18. Periodic GPS with 2% activation ratio gives as coarse grained positioning as the cell tower-based localization, far below the quality of CAPS. Thus, it can be seen that CAPS has better energy savings over periodic GPS schemes with comparable accuracy, and better accuracy compared to periodic GPS scheme with comparable energy cost.

Figure 19:
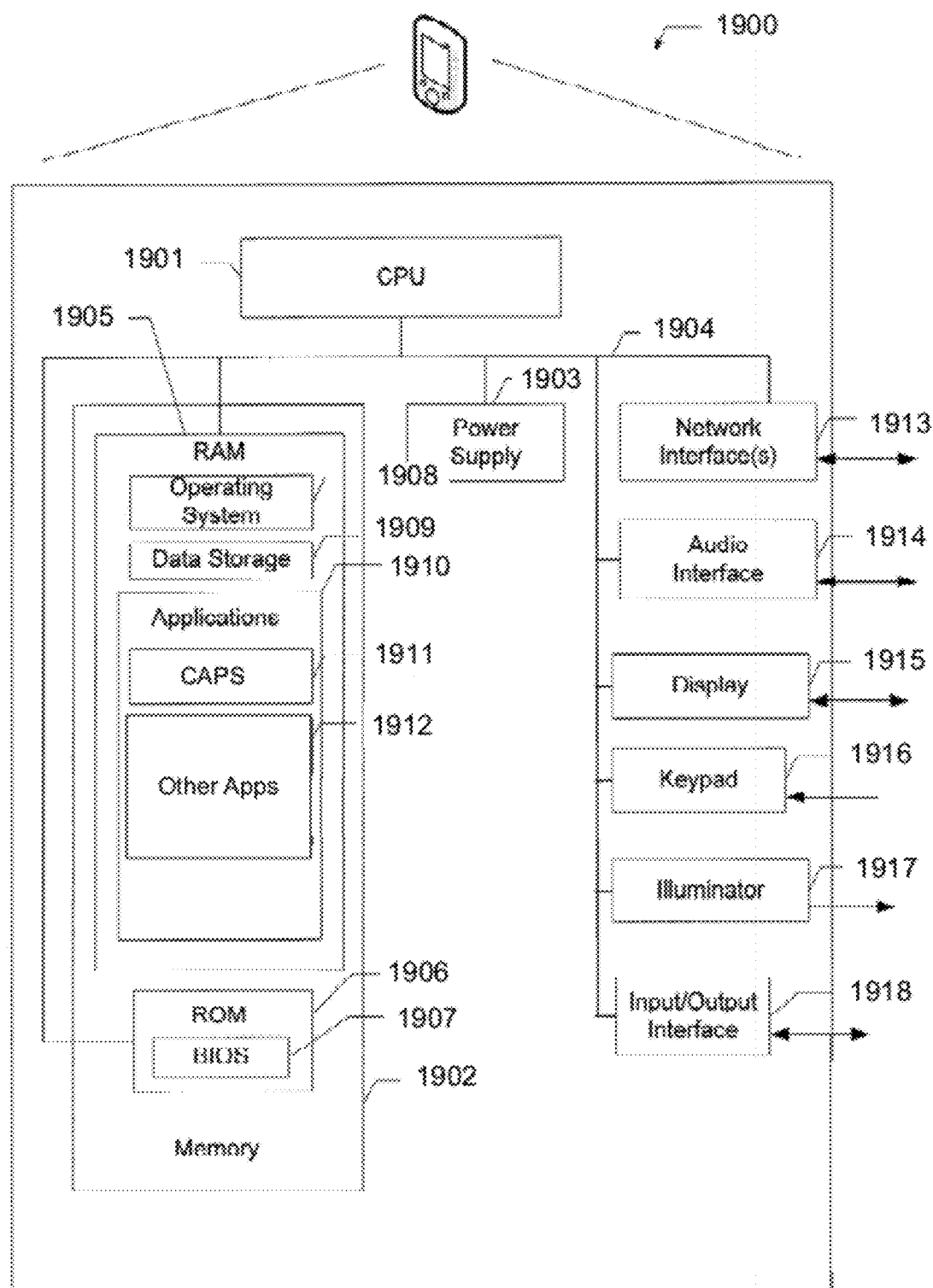
FIG. 19 is a schematic illustration of a wireless mobile device.

Although there are numerous mobile devices able to execute the described system, FIG. 19 is a schematic illustration of an example wireless mobile device 1900 usable in an embodiment of the invention. The device 1900 includes a CPU 1901, memory 1902, a power supply 1903, and other elements interconnected by one or more power and signal connection or busses 1904. The memory 1902 includes RAM 1905 and ROM 1906, including BIOS 1907.

The RAM 1905 includes an operating system 1908, data storage 1909, and applications 1910. The applications 1910 include the CAPS system 1911 described herein as well as potentially other applications 1912.

The additional device elements include one or more network interfaces 1913, an audio interface 1914 and visual interface (display 1915), and a tactile interface (keypad 1916). The device 1900 may also include and illuminator 1917 and an input/output interface 1918.

It will be appreciated that the memory 1905 is a tangible non-transitory computer-readable medium (disc, flash, etc.) and that the applications 1910, and in particular the CAPS, are bodies of computer-readable instructions stored on that computer readable medium to be read and executed by the processor 1901.

Figure 20:
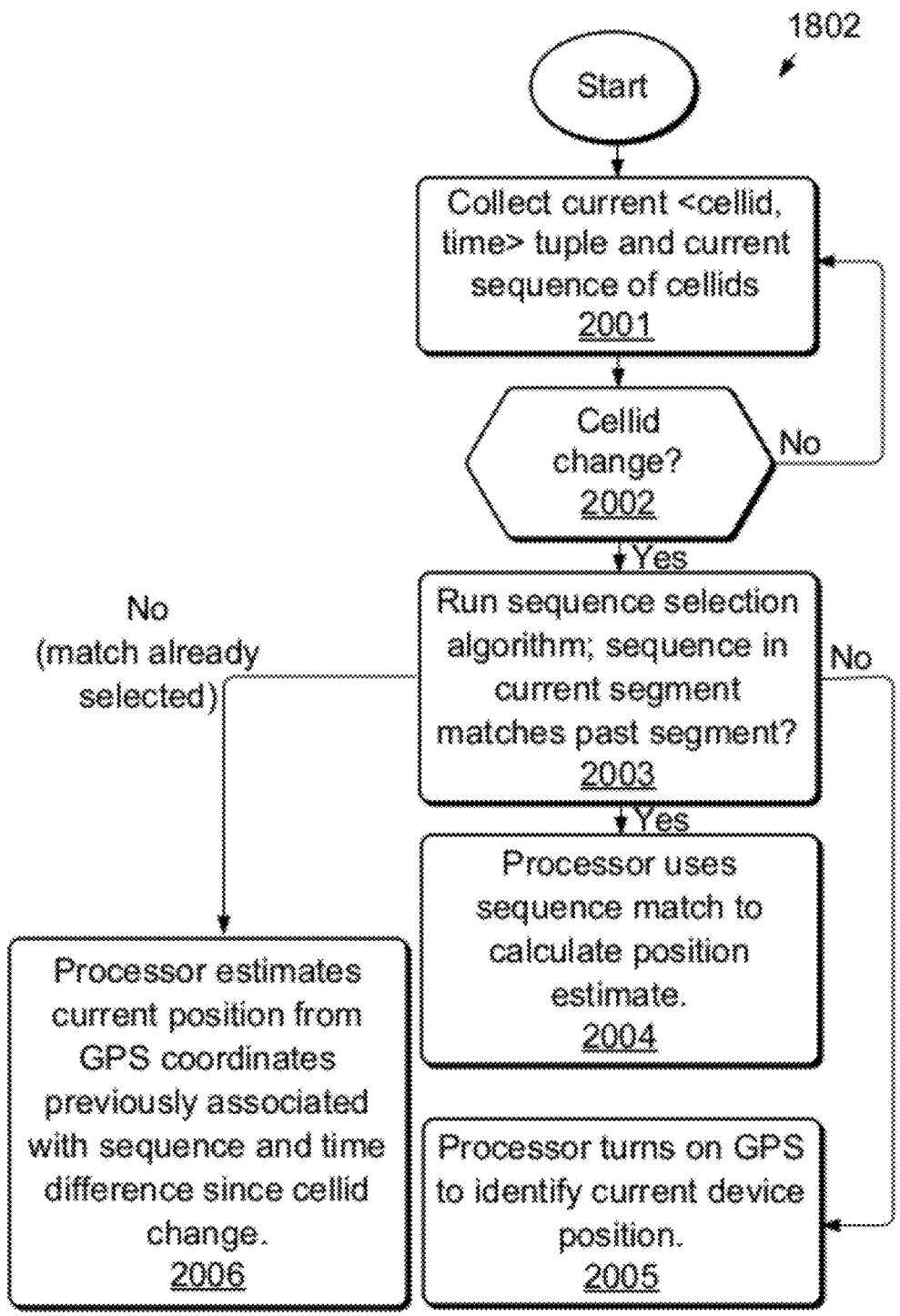
FIG. 20 is a flow chart showing a process for cellid-aided positioning according to an embodiment of the invention.

FIG. 20 is a flow chart showing a CAPS process 2000 for cellid-aided positioning according to an embodiment of the invention as described above, executed by the device processor running the application. All steps are executed by the processor of the mobile device unless otherwise indicated. The process 2000 assumes a collection of past cellid sequences and GPS readings, and thus the collection process is not explicitly shown. At stage 2001, the processor of the device collects a current <cellid, time> tuple and current sequence of cellids that the user (device) has moved through recently.

Subsequently at stage 2002, the processor determines if there has been a cellid change, i.e., if the current cellid has changed from the last time the device checked the cellid. If there has been a cellid change, the processor runs a sequence selection algorithm at stage 2003. The sequence selection algorithm determines whether there is a sequence in the current segment of cellids that matches a sequence in a past segment. If there is a match, the processor uses that sequence at stage 2004 to calculate a position estimate. For example, the position may be the same as previously when this stage in this sequence was reached and GPS coordinates were known. If there are multiple past sequences that yield a match with match length greater than zero, the processor selects one that is the best match for estimating current location, with appropriate tie-breakers as needed, as discussed above.

If there is no match at stage 2003, the processor turns on the GPS at stage 2005 to identify the current device position. If there is no change in cellid at stage 2002 and if there is a match that has been selected previously, the system estimates the current position at stage 2006 by following the GPS coordinates previously associated with that sequence based on the time difference since its entrance into that cellid. When the time difference since the entrance into that cellid corresponds to a point in time between two points in the history, the processor may interpolate to estimate the current position. In this way, the processor is able to exploit cellid changes when possible to identify device location while minimizing GPS usage.

From the foregoing, it will be appreciated that the new location identification system presented herein provides energy savings for the mobile device as compared to traditional GPS methods, without the sacrifice in accuracy that is inherent in other low energy location identification systems such as cell tower-based localization systems. However, the energy efficiency and location resolution of the CAPS system may be balanced differently than the examples presented herein without departing from the scope of the described principles.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for navigation based on a cellid-aided positioning system, the method comprising:

detecting, at a cellid-aided positioning system-compatible device, movements of the device between cellids while monitoring global positioning system (GPS) coordinates of the device, and based thereon, storing a plurality of routes traversed by the device, wherein each of the plurality of routes comprises a sequence of cellids and global positioning system (GPS) coordinates corresponding to the device as the device traversed through the route;

determining that the device has moved through a particular sequence of cellids, wherein moving through the particular sequence of cellids comprises moving from a first region corresponding to a first cellid to a second region corresponding to a second cellid;

matching the particular sequence of the cellids with a sequence of cellids in a previously stored route;

estimating a current position of the device based on the previously stored GPS coordinates corresponding to the device as the device traversed through the previously stored route and further based on an amount of time elapsed since the device entered a current cellid corresponding to the device; and displaying the current position of the device.

2. The method of claim 1, wherein matching the particular sequence of the cellids with a sequence of cellids in a previously stored route comprises:

determining a best match based on at least one of: a length of record that matches the particular sequence of cellids; a time of day; a frequency; and whether the record corresponds to a current cellid corresponding to the device.

3. The method of claim 1, wherein matching the particular sequence of the cellids with a sequence of cellids in a previously stored route comprises:

applying the Smith-Waterman Algorithm to the particular sequence of cellids and the previously stored route with penalty for gaps and mismatches and with a requirement that the current cellid corresponding to the device be in the previously recorded sequence of cellids.

4. The method of claim 1, wherein the cellid-aided positioning system-compatible device is a smartphone.

5. A device for navigation based on a cellid-aided positioning system, the device having a tangible, non-transient computer-readable medium with computer-executable instructions stored thereon, the computer-executable instructions comprising instructions for:

detecting movements of the device between cellids while monitoring global positioning system (GPS) coordinates of the device, and based thereon, storing a plurality of routes traversed by the device, wherein each of the plurality of routes comprises a sequence of cellids and global positioning system (GPS) coordinates corresponding to the device as the device traversed through the route;

determining that the device has moved through a particular sequence of cellids, wherein moving through the particular sequence of cellids comprises moving from a first region corresponding to a first cellid to a second region corresponding to a second cellid;

matching the particular sequence of the cellids with a sequence of cellids in a previously stored route;

estimating a current position of the device based on the previously stored GPS coordinates corresponding to the device as the device traversed through the previously stored route and further based on an amount of time elapsed since the device entered a current cellid corresponding to the device; and displaying the current position of the device.

6. The device of claim 5, wherein the instructions for matching the particular sequence of the cellids with a sequence of cellids in a previously stored route further comprise instructions for:

determining a best match based on at least one of: a length of record that matches the particular sequence of cellids; a time of day; a frequency; and whether the record corresponds to a current cellid corresponding to the device.

7. The device of claim 5, wherein the instructions for matching the particular sequence of the cellids with a sequence of cellids in a previously stored route further comprise instructions for:

applying the Smith-Waterman Algorithm to the particular sequence of cellids and the previously stored route with penalty for gaps and mismatches and with a requirement that the current cellid corresponding to the device be in the previously recorded sequence of cellids.

8. The device of claim 5, wherein the device is a smartphone.

* * * * *